(12) United States Patent
Bhaskar et al.

(10) Patent No.: US 11,263,023 B1
(45) Date of Patent: Mar. 1, 2022

(54) SYSTEM AND METHOD FOR UPDATING HOST OPERATING SYSTEM DRIVERS FROM A MANAGEMENT CONTROLLER

(71) Applicant: DELL PRODUCTS, LP, Round Rock, TX (US)

(72) Inventors: Anusha Bhaskar, Bangalore (IN); Praveen S. Lalgoudar, Bangalore (IN); Santosh Gore, Bangalore (IN); Muniswamy Setty K S, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/994,937

(22) Filed: Aug. 17, 2020

(51) Int. Cl.
*G06F 9/4401* (2018.01)
*G06F 13/10* (2006.01)

(52) U.S. Cl.
CPC .......... *G06F 9/4411* (2013.01); *G06F 9/4406* (2013.01); *G06F 13/102* (2013.01)

(58) Field of Classification Search
CPC ..... G06F 9/4406; G06F 9/4411; G06F 13/102
See application file for complete search history.

(56) References Cited

U.S. PATENT DOCUMENTS

| | | |
|---|---|---|
| 8,839,231 B2 | 9/2014 | Vrehl, Jr. |
| 2010/0192145 A1 | 7/2010 | Liles et al. |
| 2011/0131447 A1* | 6/2011 | Prakash ................. G06F 21/572 714/19 |
| 2014/0282483 A1* | 9/2014 | Zhang ...................... G06F 8/65 717/173 |
| 2016/0202964 A1* | 7/2016 | Butcher .................... G06F 8/65 717/172 |
| 2017/0109235 A1* | 4/2017 | Hung .................. G06F 11/1417 |
| 2017/0270301 A1* | 9/2017 | Vidyadhara ........... G06F 21/575 |
| 2017/0286086 A1* | 10/2017 | Narasimhan ............ G06F 8/654 |
| 2020/0142683 A1* | 5/2020 | Rao ........................ G06F 9/4411 |
| 2020/0210203 A1* | 7/2020 | Madala ................. G06F 9/4406 |

* cited by examiner

Primary Examiner — Glenn A. Auve
(74) Attorney, Agent, or Firm — Larson Newman, LLP

(57) ABSTRACT

An information handling system includes a basic input/output system (BIOS) that performs a firmware boot operation. During the firmware boot operation, the BIOS determines whether a driver pack management controller setting is enabled within a baseboard management controller of the information handling system. In response to the driver pack management controller setting being enabled, the BIOS copies a binary utility from the baseboard management controller to a system memory, and creates an operating system specific platform binary table to point to the binary utility on the baseboard management controller. In response to the operating system being initialized, a processor invokes the binary utility, mounts a memory partition of the baseboard management controller as a virtual drive of the operating system, and executes the operating system specific binary stage under a fixed globally unique identifier to install a driver pack.

20 Claims, 4 Drawing Sheets

US 11,263,023 B1

SYSTEM AND METHOD FOR UPDATING HOST OPERATING SYSTEM DRIVERS FROM A MANAGEMENT CONTROLLER

FIELD OF THE DISCLOSURE

The present disclosure generally relates to information handling systems, and more particularly relates to updating host operating system drivers from a management controller.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system (BIOS) and a processor. The BIOS may perform firmware boot operation. During the firmware boot operation, the BIOS may determine whether a driver pack management controller setting is enabled within a baseboard management controller of the information handling system. In response to the driver pack management controller setting being enabled, the BIOS may copy a binary utility from the baseboard management controller to a system memory, and create operating system specific platform binary table to point to the binary utility on the baseboard management controller. In response to the operating system being initialized, the processor may invoke the binary utility, mount a memory partition of the baseboard management controller as a virtual drive of the operating system, and execute the operating system specific binary stage under a fixed globally unique identifier to install a driver pack.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
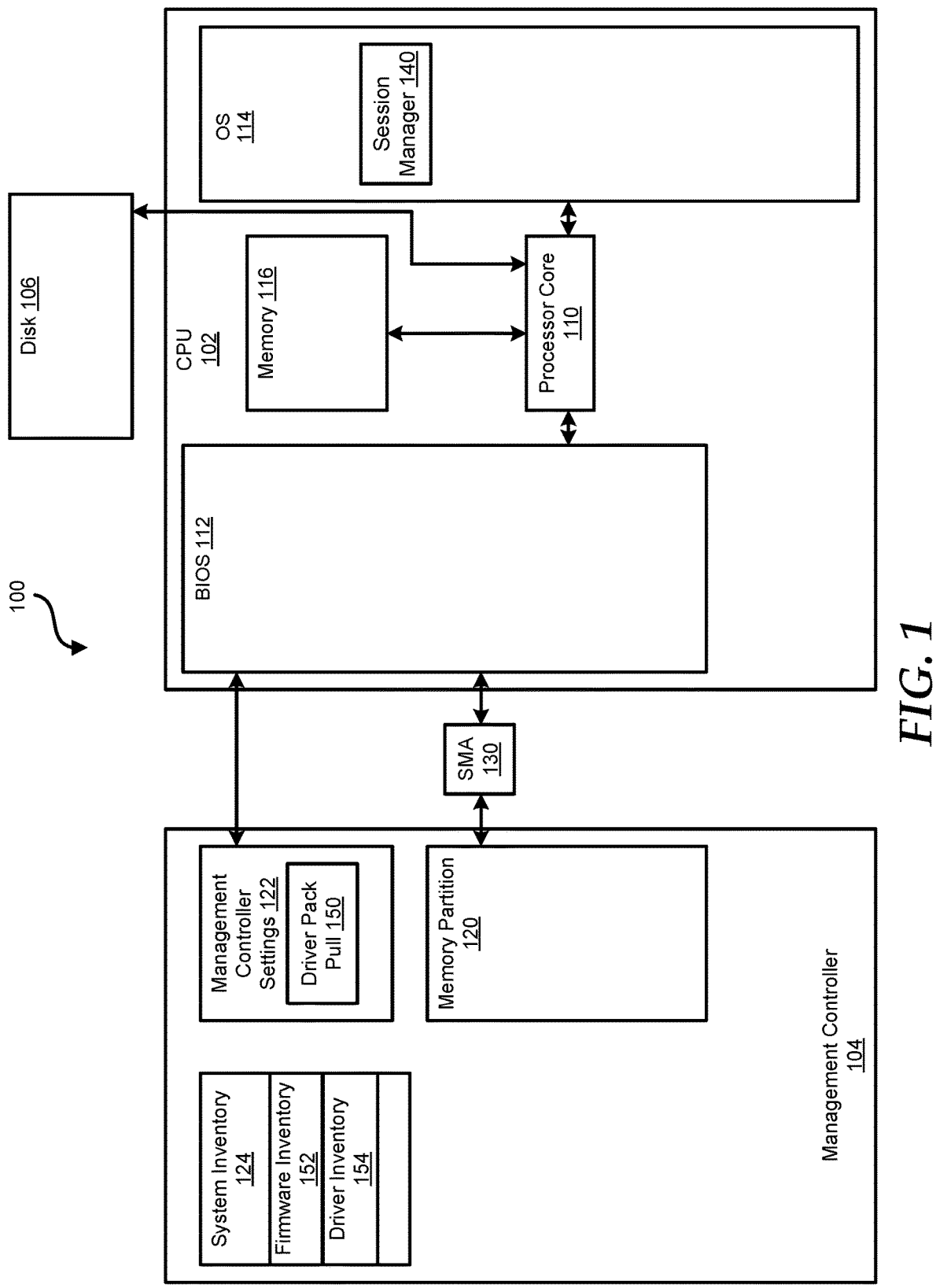
FIG. 1 is a block diagram of a portion of an information handling system according to at least one embodiment of the disclosure.
Figure 2:
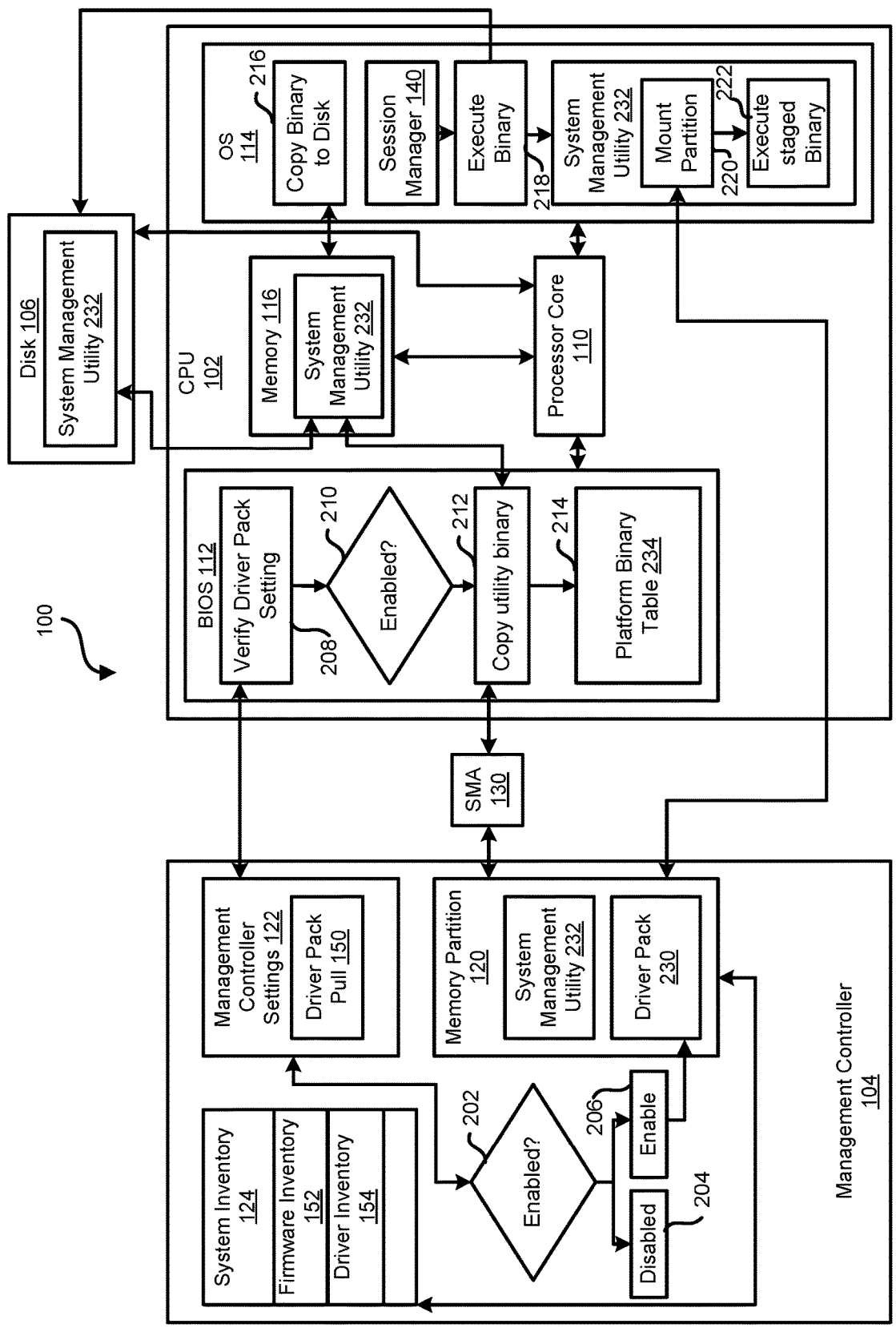
FIG. 2 is a block diagram illustrating an operational flow in the portion of the information handling system according to at least one embodiment of the present disclosure.

FIGS. 1 and 2 show a portion of an information handling system 100 including central processing unit (CPU) 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes CPU 102, a management controller 104, and a disk 106. In an example, the information handling system 100 can be a server, a personal computer, a laptop computer, or the like. CPU 102 includes a processor core 110, a basic input/output system (BIOS) 112, an operating system (OS) 114, and a memory 116. Management controller 104 includes a memory partition 120, management controller settings 122, and a system inventory 124. In an example, OS 114 may be executed in any suitable manner by CPU 110 to perform one or more operations including, but not limited to, a session manager 140. In certain examples, management controller settings 122 may include multiple settings for the management controller including, but not limited to, a lockdown setting and a driver pack pull setting 150. System inventory 124 may include multiple inventories for information handling system 100 including, but not limited to, firmware inventory 152 and driver inventory 154. In an example, firmware inventory 152 and driver inventory 154 may be associated with a platform of information handling system 100 and executed by processor 110 via OS 114. In certain examples, information handling system 100 may include additional components over those shown in FIGS. 1 and 2 without varying from the scope of this disclosure.

In an example, management controller 104 may be a baseboard management controller (BMC) and may be referred to as a service processor or embedded controller (EC). Capabilities and functions provided by management controller 104 can vary considerably based on the type of information handling system. For example, the term baseboard management system is often used to describe an embedded processor included at a server, while an embedded controller is more likely to be found in a consumer-level device. As disclosed herein, management controller 104 represents a processing device different from CPU 102, which provides various management functions for information handling system 100. For example, an embedded controller may be responsible for power management, cooling management, and the like. An embedded controller included at a data storage system can be referred to as a storage enclosure processor.

In an example, management controller 104 may be connected to various components of CPU 102 via various internal communication interfaces, such as a Low Pin Count (LPC) interface, an Inter-Integrated-Circuit (I2C) interface, a PCIe interface, system management access (SMA) 130, or the like, to provide an out-of-band (OOB) mechanism to retrieve information related to the operation of the host environment including, but not limited to, providing BIOS/UEFI or system firmware updates, providing driver updates, and managing non-processing components of information handling system 100, such as system cooling fans and power supplies.

During operation of information handling system 100, images for OS 114 may be received from any suitable source including, but not limited to, a server vendor and an OS vendor. However, the OS images may not include supported drivers for the platform of information handling system 100. In this example, if the OS images are installed via any suitable operation, then drivers staged in management controller 104 may not be utilized during OS installation. In an example, the suitable operation may include, but is not limited to, a pre-boot execution environment (PXE) of BIOS 112.

If the staged drivers are not utilized during OS installation, previous information handling systems would exhibit one or more possible issues. For example, the devices may not be functional or show yellow in a device manager due to the missing or incompatible drives. Another issue in previous information handling system when the drivers are not updated may be that device firmware may fail based on the OS not including the compatible drivers. Additionally, server component device driver security fixes may be critical to the information handling system but may not be distributed in very provisioning entity or OS distribution. In previous information handling systems these critical fixes which may be updated on existing OS may be missed on a fresh install. Therefore, information handling system 100 may be improved by BIOS 112 receiving OS compatible drivers from management controller 102 during OS boot time operations to prevent issues that may result from incompatible drivers as described herein.

Referring to now FIG. 2, management controller 104, processor core 110, and BIOS 112 may perform one or more operations to update OS drivers during boot operations of information handling system 100. FIG. 2 shows an operational flow by management controller 104, processor core 110, and BIOS 112 to update OS drivers during boot operations of information handling system 100. In an example, blocks 202, 204, and 206 may represent different operations performed by management controller 104, blocks 208, 210, 212, and 214 may represent different options performed by BIOS firmware 112, and blocks 216, 218, 220, and 222 may represent different options performed by processor core 110 during execution of OS 114.

During a reboot of the platform, such as OS 114, of information handling system 100, management controller 104 may determine whether driver pack pull setting 150 is enabled at block 202. In an example, driver pack pull setting 150 may be set in any suitable manner including, but not limited to, a user of information handling system 100 enabling the driver pack pull setting when a driver update is needed. In certain examples, the driver pack pull setting 150 may be specific to a particular OS, such as OS 114.

If driver pack pull setting 150 is not enabled, management controller 104 may not perform any other operations with respect to a driver updated as shown by disabled block 204. Alternatively, if driver pack pull setting 150 is enabled, the operation moves to block 206 and memory controller 104 may stage an OS specific driver pack 230 in memory partition 120. In certain examples, memory partition 120 may be any suitable partition of a memory of memory controller 104 including, but not limited to, mas022 partition. In an example, driver pack 230 may be pulled from driver inventory 154 and stored or staged under a predefined global unique identifier (GUID) in memory partition 120. Driver pack 230 may include drivers for hardware and other components of information handling system 100, and the drivers may be specific to OS 114. For example, driver pack 230 may include compatible drivers for network interface cards, power edge redundant array of independent disks (RAID) controllers, a chipset, or any other suitable controller. In an example, memory controller 104 may also store or stage a system management utility 232 within memory partition 120 and associated with the same GUID as driver pack 230.

During BIOS boot operations, BIOS 112 may communicate with management controller 122 to verify that driver pack pull setting 150 is enabled at block 208. In an example, BIOS 112 may communicate with management controller 122 via any suitable manner including, but not limited to, an out-of-band communication path via SMA 130. If, at block 210, driver pack pull setting 150 is enabled, BIOS 112 may copy system management utility 232 from memory partition 120 at block 212. In an example, system management utility 232 may be copied via SMA 130. In certain examples, system management utility 232 may be a binary or software that is executable by processor core 110 during an OS installation.

In an example, BIOS 112 may perform one or more suitable operations to publish system management utility 232 on a fresh or next OS install. For example, at block 214, BIOS 112 may create a platform binary table 234, which in turn may point to system management utility 232. In certain examples, platform binary table 234 may be any suitable table including, but not limited to, an advanced component peripheral interconnect (ACPI) table/windows platform binary table (WPBT), and the platform binary table may be based on OS 114 installed on information handling system 100. In an example, platform binary table 234 may enable the execution of mandatory system management task on the next OS install. For example, platform binary table 234 may include a command line option that is set to the GUID of driver pack 230 staged in memory partition 120. The creation of platform binary table 234 may result in system management utility 232 being published into memory 116.

During a subsequent boot operation and initialization of OS 114, system management utility 232 may be copied from memory 116 to disk 106 at block 216. In response to system management utility 232 being copied to disk 106, session manager 140 or any equivalent module in OS 114 may be installed. Session manager 140 may then perform one or more operations to invoke system management utility 232. For example, session manager 140 may utilize the command line in platform binary table 234, which as stated above points to the fixed GUID of driver pack 230. Session manager 140 may execute the binary associated with system management utility 232 at block 218. System management utility 232 may mount memory partition 120 on CPU 102 at block 220. For example memory partition 120 may be mounted as a virtual drive or memory accessible by OS 114. System management utility 232 may then execute the binary staged under the fixed GUID in memory partition 120. For example, the execution of the binary may cause driver pack 230 to be loaded and installed within CPU 102, such that the compatible drivers for OS 114 are installed on CPU 102. In an example, system management utility 232 may provide status updates for the execution of the driver updates to BIOS 112 via ACPI control operations or any other suitable operation.

Thus, the operations of memory controller 104, processor core 110, and BIOS 112 described above may improve information handling system 100 by providing a seamless OS driver updates via the memory controller. These operations may further improve information handling system 100 by causing OS boot and device functions to remain uninterrupted during a new OS installation. In an example, the operations described above may be performed to update firmware compatible drivers during (SMSSInit) of OS initialization before winlogon is executed.

Figure 3:
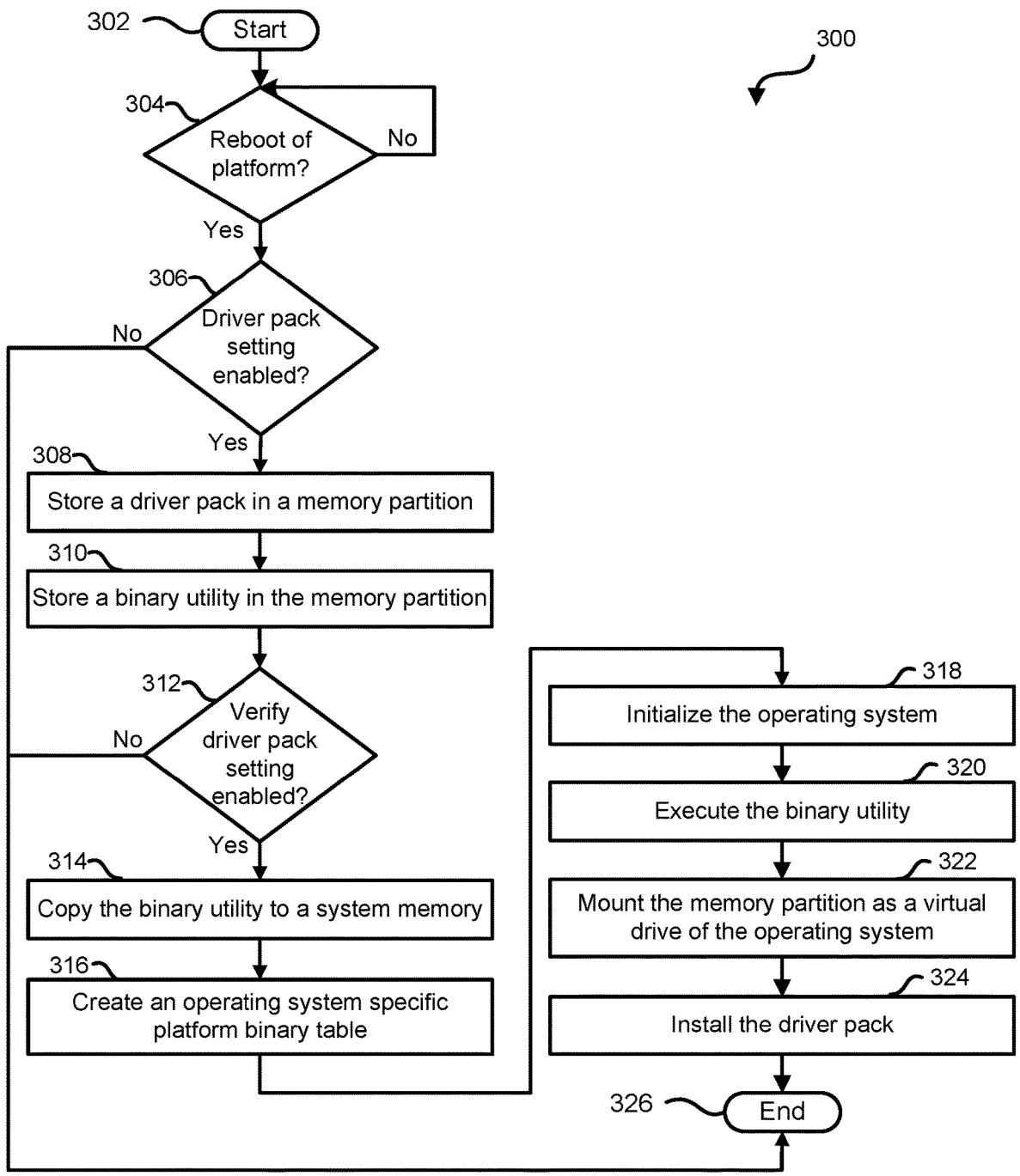
FIG. 3 is a flow diagram of a method for updating host operating system drivers from a management controller according to at least one embodiment of the present disclosure.

FIG. 3 is a flow diagram of a method 300 for updating host operating system drivers from a management controller according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1 or any other type of system, controller, device, module, processor, or any combination thereof, operable to employ all, or portions of, the method of FIG. 3.

At block 304, a determination is made whether a platform of an information handling system was rebooted. In an example, the platform may be any suitable software including, but not limited to, an OS of the information handling system. In response to the platform being rebooted, a determination is made whether a driver pack setting is enabled at block 306. In an example, driver pack setting may be set in any suitable manner including, but not limited to, a user of an information handling system enabling the driver pack setting when a driver update is needed. In certain examples, the driver pack setting may be specific to a particular OS.

If driver pack setting is not enabled, the flow ends at block 326. Otherwise, if driver pack setting is enabled, a driver pack is stored in a memory partition at block 308. In an example, the driver pack may be an OS specific driver pack. In certain examples, the driver pack may be stored or staged under a pre-defined global unique identifier (GUID) in memory partition. Driver pack may include drivers for hardware and other components of the information handling system. At block 310, a system management utility is stored or staged within memory partition. In an example, the system management utility may be associated with the same GUID as the driver pack.

During BIOS boot operations, a determination is made to verify that the driver pack setting is enabled at block 312. If the driver pack setting is not verified as enabled, the flow ends at block 316. Otherwise, if driver pack setting is verified as enabled, the system management utility is copied from the memory partition a system memory at block 314.

In an example, BIOS 112 may perform one or more suitable operations to publish system management utility 232 on a fresh or next OS install. At block 316, a platform binary table is created. In an example the platform binary table may point to the system management utility. In certain examples, the platform binary table may be any suitable table including, but not limited to, an ACPI table/WPBT, and the platform binary table may be based on an OS installed on the information handling system. In an example, the platform binary table may enable the execution of mandatory system management task on the next OS install. For example, the platform binary table may include a command line option that is set to the GUID of driver pack staged in memory partition.

At block 318, the OS is initialized. At block 320, a binary utility, such as the system management utility is executed. At block 322, the memory partition is mounted. In an example memory partition 120 may be mounted as a virtual drive or memory accessible the OS of the information handling system. At block 324, the driver pack is installed, and the flow ends at block 326. In an example, the driver pack may be installed in any suitable manner including, but not limited to, the execution of the binary utility, such that the compatible drivers for the OS are installed on a CPU of the information handling system.

Figure 4:
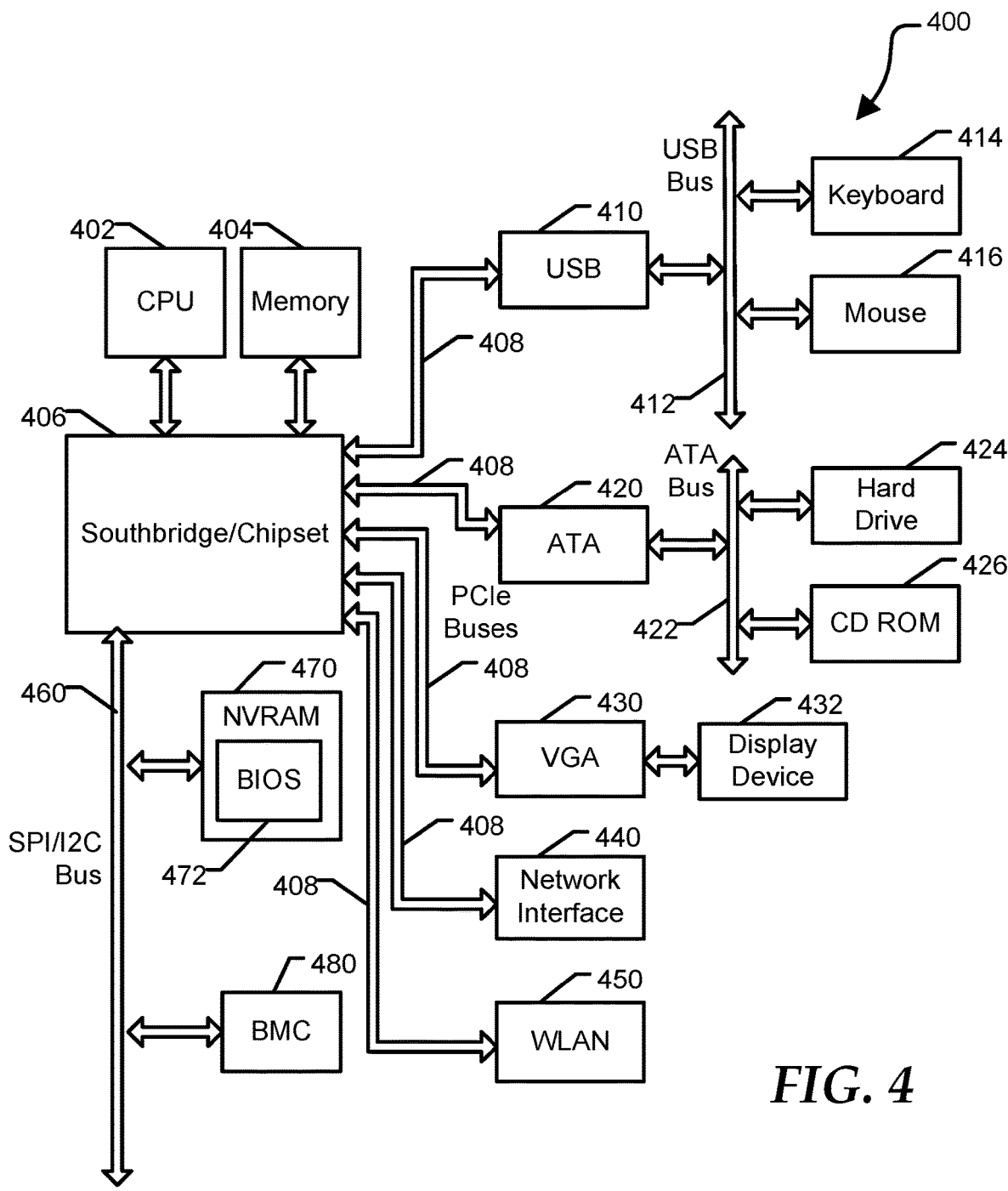
FIG. 4 is a block diagram of a general information handling system according to an embodiment of the present disclosure.

FIG. 4 illustrates a general information handling system 400 including a processor 402, a memory 404, a southbridge/chipset 406, one or more PCIe buses 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. In an example, chipset 406 may be directly connected to an individual end point via a PCIe root port within the chipset and a point-to-point topology as shown in FIG. 4. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of southbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a basic input/output system (BIOS) to perform a firmware boot operation, during the firmware boot operation the BIOS to:
        determine whether a driver pack management controller setting is enabled within a baseboard management controller of the information handling system;
        in response to the driver pack management controller setting being enabled:
            copy a binary utility from the baseboard management controller to a system memory; and
            create an operating system specific platform binary table to point to the binary utility on the baseboard management controller; and
    a processor to communicate with the BIOS, in response to an operating system being initialized, the processor to:
        execute the binary utility;
        mount a memory partition of the baseboard management controller as a virtual drive of the operating system; and
        execute the operating system specific binary stage under a fixed globally unique identifier to install a driver pack.

2. The information handling system of claim 1, wherein:
    the baseboard management controller including the memory partition, in response to a reboot of a platform of the information handling system, the baseboard management controller to:
    determine whether the driver pack management controller setting is enabled; and
    in response to the driver pack management controller setting being enabled:
        store the driver pack within the memory partition, the driver pack is associated with an updated operating system of the information handling system; and
        store the binary utility in the partition, the binary utility is compatible with the operating system.

3. The information handling system of claim 1, wherein the BIOS to copy the binary utility from the baseboard management controller to the system memory further includes, the BIOS to:
    transfer the binary utility from the baseboard management controller to a platform firmware; and
    transfer the binary utility from the platform firmware to the system memory.

4. The information handling system of claim 3, wherein the transfer of the binary utility from the baseboard management controller to the platform firmware is performed via an out-of-band communication between the BIOS and the baseboard management controller.

5. The information handling system of claim 1, wherein the processor further to transfer the binary utility to a disk of the information handling system prior to the execution of the binary utility.

6. The information handling system of claim 1, wherein the BIOS further to communicate a binary utility status to the processor.

7. The information handling system of claim 1, further comprising:
    a session manager of the operating system, the session manager to invoke the binary utility with a command line option set to the fixed globally unique identifier.

8. The information handling system of claim 1, wherein the binary utility is a system management utility identified by the fixed globally unique identifier.

9. The information handling system of claim 1, wherein a state of the driver pack management controller setting is set by a user of the information handling system prior to a reboot of the platform.

10. A method comprising:
    executing, by a basic input/output system (BIOS) of an information handling system, an operating system;
    determining whether a driver pack management controller setting is enabled within a baseboard management controller of the information handling system;
    in response to the driver pack management controller setting being enabled:
        copying a binary utility from the baseboard management controller to a system memory; and
        creating an operating system specific platform binary table to point to the binary utility on the baseboard management controller; and
    in response to the operating system being initialized:
        executing, by a processor, the binary utility;
        mounting a memory partition of the baseboard management controller as a virtual drive of the operating system; and
        executing an operating system specific binary stage under a fixed globally unique identifier to install a driver pack.

11. The method of claim 10, further comprising:
    in response to a reboot of a platform of the information handling system
        determining, by a baseboard management controller, whether the driver pack management controller setting is enabled; and in response to the driver pack management controller setting being enabled:
storing the driver pack within the memory partition, the driver pack is associated with an updated operating system of the information handling system; and
storing the binary utility in the memory partition, the binary utility is compatible with the operating system.

12. The method of claim 10, wherein copying of the binary utility from the baseboard management controller to the system memory includes:
transferring the binary utility from the baseboard management controller to a platform firmware; and
transferring the binary utility from the platform firmware to the system memory.

13. The method of claim 12, wherein the transfer of the binary utility from the baseboard management controller to the platform firmware is performed via an out-of-band communication between the BIOS and the baseboard management controller.

14. The method of claim 10, wherein the processor further to transfer the binary utility to a disk of the information handling system prior to the execution of the binary utility.

15. The method of claim 10, wherein the BIOS further to communicate a binary utility status to the processor.

16. The method of claim 10, further comprising:
invoking, by a session manager of the operating system, the binary utility with a command line option set to the fixed globally unique identifier.

17. The method of claim 10, wherein the binary utility is a system management utility identified by the fixed globally unique identifier.

18. A non-transitory computer-readable medium including code that when executed by a processor causes the processor to perform a method, the method comprising:
executing an operating system;
determining whether a driver pack management controller setting is enabled within a baseboard management controller of an information handling system;
in response to the driver pack management controller setting being enabled:
copying a binary utility from the baseboard management controller to a system memory; and
creating an operating system specific platform binary table to point to the binary utility on the baseboard management controller; and
in response to the operating system being initialized:
executing the binary utility;
mounting a memory partition of the baseboard management controller as a virtual drive of the operating system; and
executing an operating system specific binary stage under a fixed globally unique identifier to install a driver pack.

19. The non-transitory computer-readable medium of claim 18, wherein the method further comprises:
in response to a reboot of a platform of the information handling system
determining, by a baseboard management controller, whether the driver pack management controller setting is enabled; and
in response to the driver pack management controller setting being enabled:
storing the driver pack within the memory partition, the driver pack is associated with an updated operating system of the information handling system; and
storing the binary utility in the partition, the binary utility is compatible with the operating system.

20. The non-transitory computer-readable medium of claim 18, wherein the coping of the binary utility from the baseboard management controller to the system memory further includes:
transferring the binary utility from the baseboard management controller to a platform firmware; and
transferring the binary utility from the platform firmware to the system memory.

* * * * *